May 17, 1955
J. L. DALLAS
2,708,520
SETTLING TANK
Filed Oct. 3, 1951
3 Sheets-Sheet 1
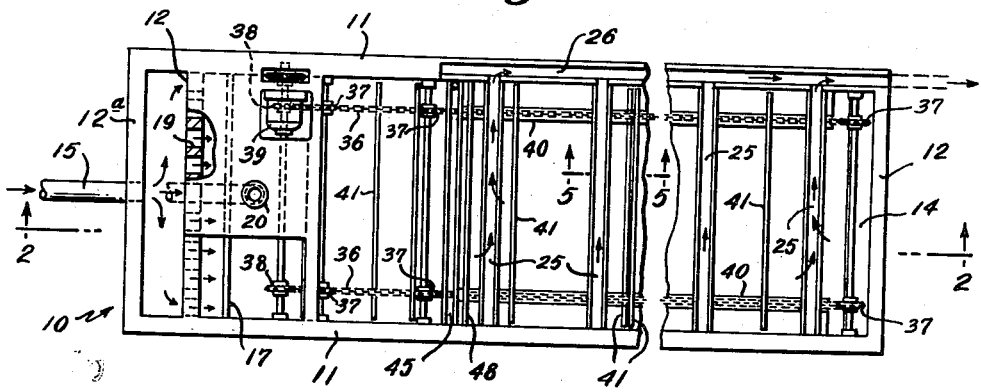
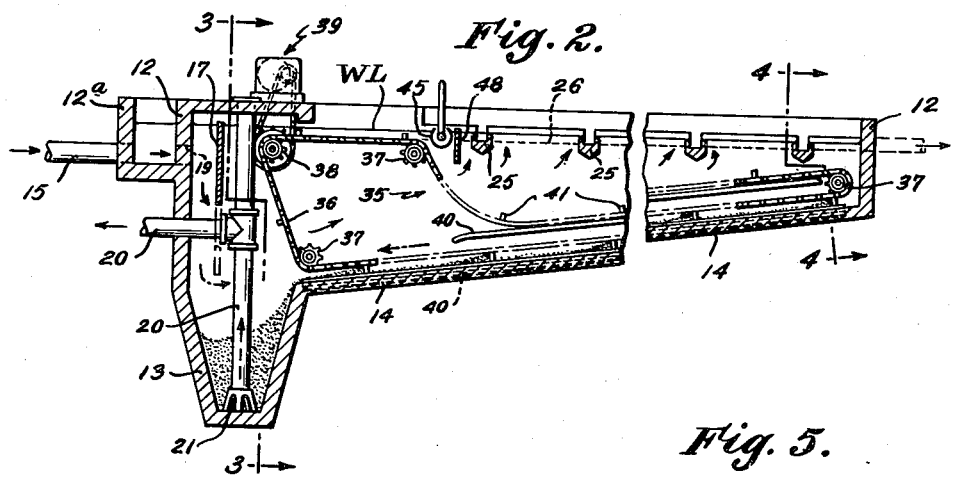
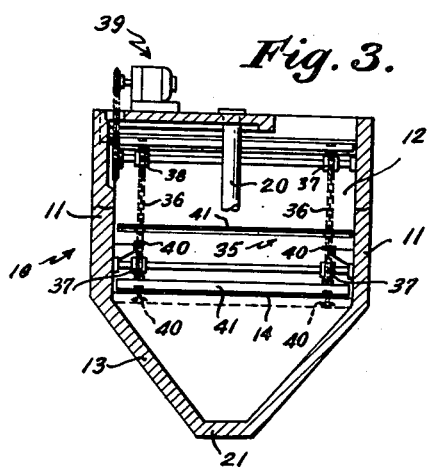
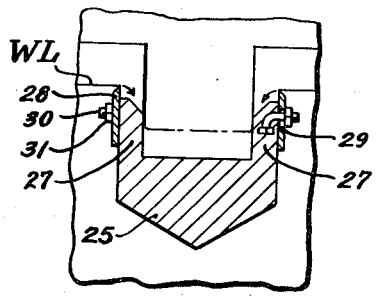
Inventor,
James L. Dallas,
by Heard, Smith, Porter & Chittick
Attys.

Inventor,
James L. Dallas,
by Heard, Smith, Porter + Chittick
Attys.

May 17, 1955
J. L. DALLAS
2,708,520
SETTLING TANK
Filed Oct. 3, 1951
3 Sheets-Sheet 3
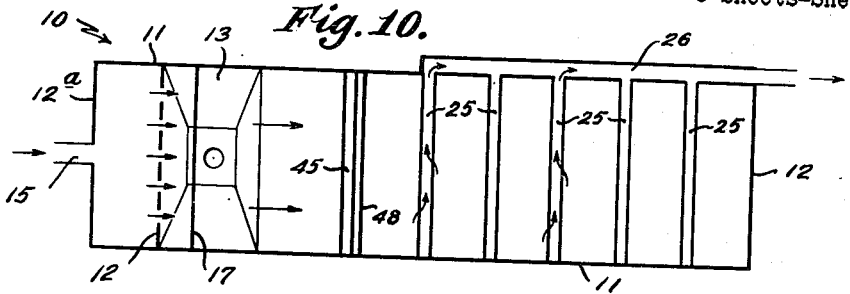
Fig. 10.
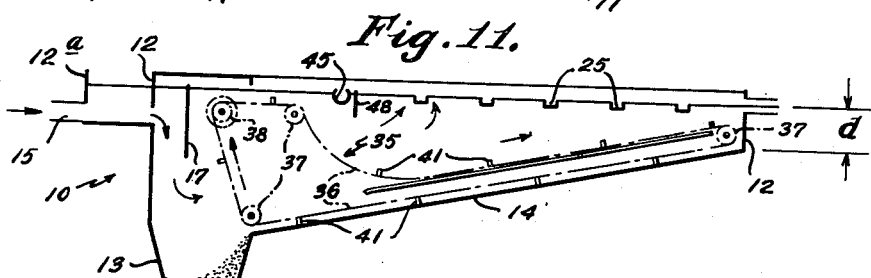
Fig. 11.
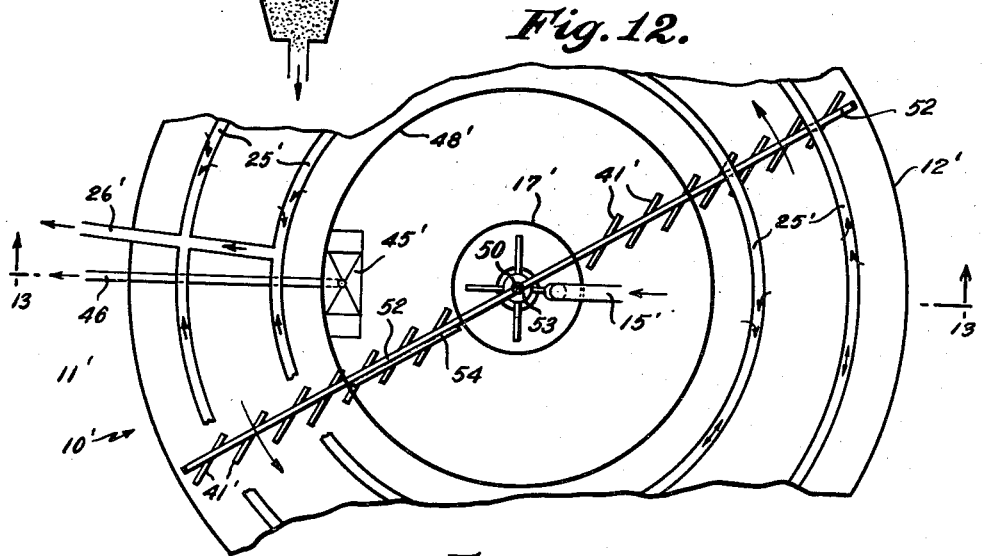
Fig. 12.
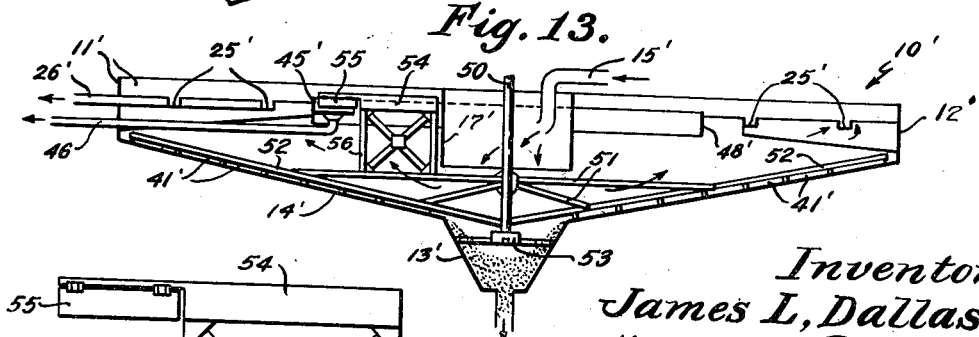
Fig. 13.
Fig. 14.
Inventor,
James L. Dallas,
by Heard, Smith, Porter + Chittick
Att'ys.

United States Patent Office 2,708,520
Patented May 17, 1955

2,708,520

SETTLING TANK

James L. Dallas, Beverly, Mass.

Application October 3, 1951, Serial No. 249,476

4 Claims. (Cl. 210—55)

This invention relates to settling tanks for removing suspended solids from liquids, as are widely used in water purification, sewage disposal, and in the recovery and purification of industrial wastes.

Settling tanks and sedimentation apparatus have long been used, and the method usually employed is to introduce the liquid carrying the suspended solids into a large tank, which may be rectangular, square, or circular as desired; pass the liquid slowly through the tank for the necessary period of time required to accomplish the desired settlement of the solids, draw off the clarified liquid, and as required, remove the collected solids from the tank. Naturally, the size and capacity of the tank, and the detention period in the tank, depend upon the nature of the liquids being processed and the results sought in the particular case. As an illustration, a settling tank commonly used in sewage disposal, either as a primary, or final tank, is rectangular in shape, has a width about ⅓ to ¼ its length, and a depth usually from 8 to 16 feet. The detention period for the water to pass through the tank is usually 2 to 4 hours. The sewage is flowed in at one end, and allowed to flow off into troughs at the top of the tank at the opposite end. Mechanical means is provided for collecting the sludge at the bottom of the tank, usually comprising an endless chain belt carrying blades which scrape the collected sludge into a sump or depressed hopper provided at the influent end of the tank, from which it is drawn off.

I have sought to improve the efficiency of such settling tanks by providing a design of the tank to process a given volume of liquid in a shorter period of time, to reduce the detention period for the water to pass through the tank. To that end I have made careful studies and tests of the behavior of such liquids carrying suspended solids, and the manner of the settling of the solids therein. Theoretically, the necessary period of detention depends in part upon the size and specific gravity of the suspended solids and viscosity of the liquid, but other factors, such as the momentum of the incoming flow and differences in temperature between the incoming sewage and that already in the tank may influence the efficiency. It is generally accepted that the removal of solids from liquids by sedimentation is determined by Stokes' law, according to which the settling rate of the solid particles in relation to the surrounding liquid is defined as a function of the difference in specific gravity between the solid and the liquid, of the square of the radius of the solid particle, and of the viscosity of the liquid.

The path of a settling particle in a settling tank is the locus of the resultant of its vertical and horizontal velocity components. These paths are shown in the diagram in Fig. 6, where solids in the liquid entering at the upper left end of the tank are shown to settle out in gradually diminishing quantities from the inlet to the outlet end of the tank. In Fig. 7 line S, extending from the upper left end of the tank to the lower right end, represents the path of the largest size particle in the effluent entering at the top of the inlet and whose settling velocity is insufficient to cause it to settle out before reaching the end of the tank, and thus it will be retained and discharged in the effluent. Accordingly the area below the line S in the settling tank is an unclarified zone where effective sedimentation is still occurring, and the area above the line S is a clarified zone where particles will still remain in the effluent after reaching the end of the tank. It will thus be observed that in such an ideal tank as that shown one-half the space of the settling tank is used simply as storage for water which has already reached its maximum stage of clarification.

I have accordingly sought to design a settling tank of greatly improved efficiency which will eliminate this waste storage space for water which has already reached its maximum stage of clarification, and in which this water can be drawn off through multiple effluents as soon as it reaches its maximum state of clarification. Further to maintain a uniform horizontal flowing through velocity of the liquid in the tank, I have gradually reduced the cross-sectional area of the tank by sloping the bottom upwardly from the inlet toward the outlet end at a rate proportional to the amount of water removed. The theoretical design of such a settling zone is shown diagrammatically in Fig. 8, and the paths of settlement of the discrete particles shown theoretically in Fig. 6 would be transformed as shown diagrammatically in Fig. 9.

In further explanation of the diagram shown in Figs. 6 to 9 inclusive, the symbols used therein are defined as follows:

T—Time of settling.
L—Length of tank.
D—Initial depth.
d—Final depth.
V—Velocity of settling.
Vv—Vertical velocity of settling.
Z1—Zone of hindered settling.
Z2—Zone of unhindered settling.
Zu—Unclarified zone.
Zc—Clarified zone.
Id—Distributed influent.
S—Assumed settling path of largest particle retained in effluent.
Ed—Distributed effluent.
Eq—Curve of cumulative quantity of effluent.

I am aware from experiments that the path of flow of water through settling tanks of conventional rectangular design and with usual velocities are not in a straight line as shown in the diagrams mentioned, and that differences in density and temperature in the water in the tank will set up currents which will interfere with such straight line paths of flow. However, I have found that the density currents can be reduced to permit ideal sedimentation with fractional removal of clarified surface water as indicated in these diagrams.

Accordingly I have designed a more efficient form of settling tank, with an upwardly sloping bottom which counteracts density currents. The slope at the bottom of the settling zone as shown diagrammatically in Fig. 9 is equal to the slope of the path of settlement of the largest particle which would still be retained in the effluent in transit to the end of the tank or along the line S of Fig. 7. The tank is thus designed according to the following formula:

$$S = \frac{Vv.D.W}{Q}$$

in which:

$S$ = Slope of bottom of settling zone
$Vv$ = Settling velocity of critical particle in ft./min.
$D$ = Initial depth of settling zone in ft.
$W$ = Width of settling zone in ft.
$Q$ = Cubic feet per minute of material treated To the size of settling zone determined from the above formula would be added allowances for entrance, sludge hopper, and sludge removal equipment zones as the case of the subject design might be.

At the same time the clarified liquid is removed at progressive points along the tank as soon and as fast as the particles of critical size or larger have settled out of it during the fractional period of the total detention time of the tank. I have established by tests that density currents do affect the horizontal velocity of flow of the liquid through conventional tanks. I have observed that as the suspended solids are settled out of liquids, the relative density of the liquid becomes progressively less, and as the more dense solid particles settle out in a given volume of liquid, they are replaced by particles that are less dense, and as long as the particles keep settling out its density becomes progressively less. If and when the less dense liquid becomes clarified and rises by displacement it is of course carried off through the effluents.

My tank also includes mechanical means for removing the sludge collected in a sump or depressed hopper at the inlet end of the tank where it may be removed, either by draining off or by pumping. It will be understood that the tank may be built in circular as well as rectangular form.

By means of my design of tank the efficiency of a tank of given rectangular length and width is greatly increased, by reducing the detention time of the liquid in the tank. The cost of installation of tanks is considerably reduced by eliminating waste space normally required to store clarified liquid in the conventional horizontal flow rectangular tanks. Thus the capacity of a large settling area is attained with greatly reduced tank volume.

Briefly my invention comprises a tank which may be rectangular (or circular) having a sump or depressed hopper at the inlet end of the tank, and a sedimentation chamber having a floor sloping upwardly from the inlet end of the tank toward the outlet end, a plurality of spaced effluent troughs provided at the water level of the tank for carrying off the clarified liquid, and a mechanical sludge collector comprising an endless chain conveyor carrying blades for scraping the sludge collected on the bottom of the sedimentation chamber and directing it into the sump. From the sump the sludge is carried off through a gravity drain or pumped. The angle of slope of the sloping bottom of the tank is preferably determined by the formula $$S = \frac{Vv.D.W}{Q}$$

as stated above.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a plan view of a rectangular tank showing my installation;

Fig. 2 is a vertical section on lines 2—2 of Fig. 1;

Fig. 3 is a transverse vertical section on lines 3—3 of Fig. 2;

Fig. 5 is a section on lines 5—5 of Fig. 1;

Fig. 10 is a diagrammatic plan view of my settling tank corresponding to Fig. 1;

Fig. 11 is a diagrammatic view of my settling tank corresponding to Fig. 2;

Fig. 12 is a digrammatic plan view of a circular tank embodying my invention;

Fig. 13 is a vertical section on lines 13—13 of Fig. 12; and

Fig. 14 is an enlarged view of the skimmer blade shown in Fig. 13.

Figure 4:
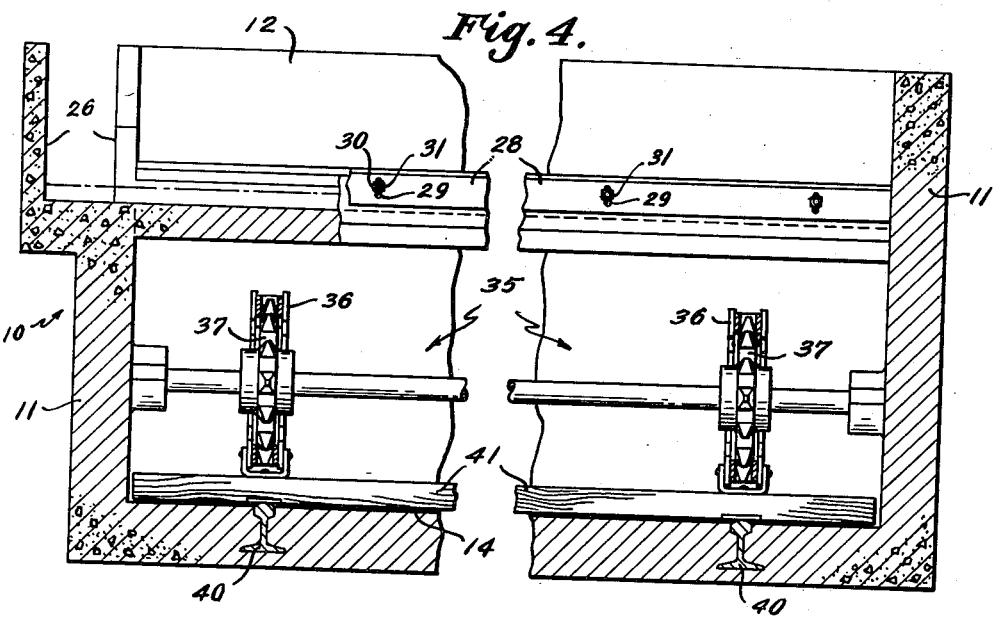
Fig. 4 is a section on lines 4—4 of Fig. 2.
Figure 6:
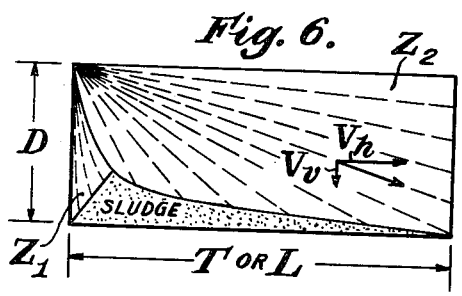
Fig. 6 is a diagrammatic representation of the behavior of unhindered discrete particles in an ideal simple settling tank.
Figure 7:
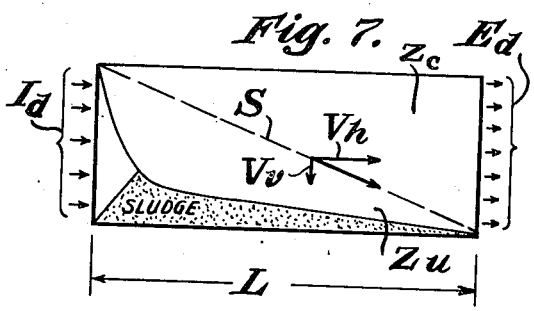
Fig. 7 is a diagrammatic representation of the settling zones of an ideal tank as discussed herein.
Figure 9:
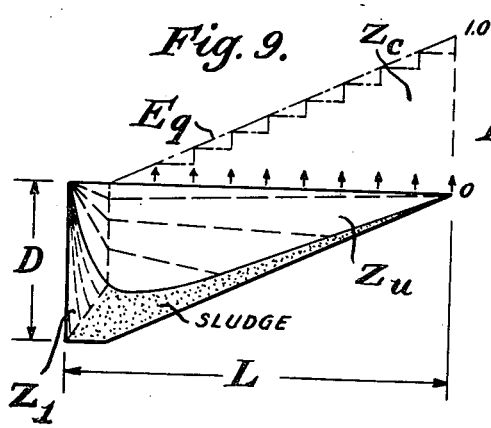
Fig. 9 is a diagrammatic representation of my settling tank divided as to its settling zones and showing proportional removal of the effluent from inlet to outlet ends.
Figure 8:
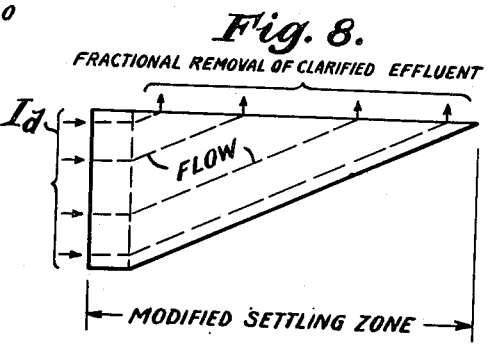
Fig. 8 is a diagrammatic representation of a modified settling zone.

As shown in the drawings 10 represents the body of my settling tanks, shown as rectangular in shape, having sides 11 and ends 12, inlet end at the left, and its outlet end at the right, shown in Figs. 1 and 2. 12a is an auxiliary wall to provide an influent chamber. At the inlet end a sump or depressed hopper 13 extends transversely across the bottom of the tank, to receive the collected sludge as explained below. Beyond the sloping walls of the sump 13 the bottom 14 of the tank slopes upwardly from the inlet end toward the outlet end of the tank 10. As previously explained for greatest efficiency the angle of slope of the bottom 14 is preferably determined by the formula $$S = \frac{Vv.D.W}{Q}$$

It is apparent, however, that the angle of slope of bottom 14 may be varied somewhat at the expense of efficiency without departing from my invention. It will be understood that the walls 11, 12, 13 and bottom 14 of the tank are preferably made of concrete, but any other suitable material may be used. The sewage or other liquid carrying suspended solids to be settled out is introduced into the tank 10 through the inlet pipe 15 to the influent chamber and then through ports 19 in inlet wall through which it impinges against a transverse vertical baffle 17, which is made variable as to depth, but which may extend to a depth at most level with the lower end of bottom 14. The baffle 17 may have ports provided therein for permitting the influent liquid to pass through the baffle to a small degree, as well as under it. A pipe 20 with ports 21 at the bottom thereof is provided in the sump 13 to pump off the collected sludge. But it will be understood that a gravity drain may be provided from the bottom of sump 13 in place of pipe 20, if desired. Arranged transversely across tank 10 and at the top or water level WL thereof is a plurality of spaced effluent troughs 25, which empty into the effluent channel 26 provided at one or both ends of the troughs. The effluent troughs 25 are shown in enlarged detail in Fig. 5 and comprise a channelled trough with sides 27 on which are mounted adjustable weirs or knife edges 28, over which the liquid in the tank 10 will overflow when its level rises to the top of the knife edge 28, to be carried off through the effluent channel 26 to a drain (not shown). Knife edges 28 are made adjustable as to height by having vertical slots 29 therein through which bolts 30 extend, and on which the blades 28 are held in adjusted position by means of the nuts 31. In this manner the knife edges 28 can be adjusted for proper level. It will be understood, however, that the top of weirs 28 may be serrated with V shaped notches, if desired.

As is clearly illustrated in Fig. 2, the portion of the tank that is defined at its bottom by the sloping floor 14 forms a single, substantially unobstructed sedimentation chamber with the depth of the liquid at the influent end of said chamber being at least approximately twice that of the liquid depth at said marginal wall 12.

A mechanical sludge collector is provided for scraping the sludge which has collected on the sloping bottom 14 of the tank 10 into the sump 13. The sludge collector shown at 35 generally comprises a pair of parallel endless chains 36 mounted on suitable sprockets 37 and driven from driving sprocket 38, powered by motor and gear reduction unit 39. A pair of upper and lower longitudinal rails 40 are provided in the bottom 14 of the tank and parallel therewith are provided for supporting the chains 36. The chain 36 carries a series of transverse scrapers or blades 41 which traverse the full width of the bottom of the tank and scrape the collected sludge thereon into the sump 13 where it is carried off as explained above. A transverse rotating scum collector 45 is further provided at the water level of the tank, and has openings therein for carrying off the floating scum. As this is a standard device it need not be described in detail. A transverse vertical baffle 48 is further provided between the scum collector 45 and adjacent effluent trough 25. The operation of the sludge collector 35 is preferably intermittent, but it may be continuously operated if desired.

In Figs. 12, 13 and 14 are shown my settling tanks in a circular form of tank. To the extent that parts correspond functionally to those shown in the rectangular form of tanks in the previous drawings they bear the same reference characters with the addition of a prime mark. The circular tank, therefore, shown generally at 10' includes the external peripheral wall 11'. A sump 13' is provided at the center of the circular tank having a bottom 14' sloping upwardly from the center toward the side wall 11'. The influent enters through the pipe 15' into the influent receiving chamber 17' under which the influent flows outwardly into the tank. Spaced circular effluent troughs 25' are provided at the water line of the tank to carry off the clarified liquids through the effluent outlet 26'. A circular baffle 48' is provided in the tank outside the receiving chamber 17 and inside the effluent troughs 25'. A mechanical sludge collector rotating on central driven shaft 50 carrying supports 51 and opposed radial arms 52 on which are mounted a series of blades or scrapers 41' which scrape the collected sludge from the bottom 14' of the tank into the central sump 13'. The shaft 50 is mounted in central bearing 53. Also mounted on the support 51 is a carriage 56 carrying a skimmer blade 54 having on its outer end a hinged portion 55 (shown in enlarged detail in Fig. 14), the function of which is to collect the accumulated scum on the top of the water and direct it into the scum collecting box 45' from which it is carried off through pipe 46. It will be understood that the arms 52 carrying the scraper blades 41' rotate on central shaft 50 (as shown by the arrows in Fig. 12), to direct the accumulated sludge into the central sump 13'.

I claim:

1. Apparatus for separating suspended solids from liquids by sedimentation, comprising a tank having a bottom sump for receiving the settled sediment; an inlet located to deliver the influent liquid into the tank above the sump, a marginal wall spaced from the inlet in the direction of flow of the liquid through the tank, and a floor extending from the sump to said marginal wall and sloping upwardly at an angle to the horizontal which is approximately equal and opposite to the angle formed by the relatively downwardly sloping path of settlement of the largest solid particle which will be retained in the liquid that traverses the tank from the inlet to said marginal wall; the portion of the tank that is defined at its bottom by the sloping floor forming a single substantially unobstructed sedimentation chamber with the depth of the liquid at the influent end of said chamber being at least approximately twice that of the liquid depth at said marginal wall; a plurality of adjustable effluent troughs located in the tank near the surface of the liquid therein and so spaced as to permit fractional removal of the liquid as it becomes clarified at a rate which is approximately proportional to the reduction in depth of the liquid in the tank from the sump to said marginal wall, due to the sloping floor, to maintain approximately uniform the horizontal velocity of flow of all of the liquid during its passage through the aforesaid single sedimentation chamber of the tank.

2. Apparatus for separating suspended solids from liquids by sedimentation, according to claim 1 which includes means for moving the settled sediment along the sloping bottom to said sump.

3. Apparatus for separating suspended solids from liquids by sedimentation according to claim 1 in which the ratio of the amount of rise to the horizontal distance of the upward slope of the floor of the sedimentation chamber is approximately equal to $$\frac{V_v . D . W}{Q}$$

where $V_v$ equals the settling velocity in feet per second of the largest solid particle which will be retained in the effluent, D equals the initial depth in feet of the sedimentation chamber, W equals the width in feet of the sedimentation chamber, and Q equals the quantity in cubic feet per second of liquid treated.

4. Apparatus for separating suspended solids from liquids by sedimentation, according to claim 1 which includes a scum baffle and scum collecting device near to and on the influent side of the first effluent trough.

References Cited in the file of this patent

UNITED STATES PATENTS

| | | |
|---|---|---|
| 876,923 | Rothwell | Nov. 29, 1910 |
| 2,160,838 | Dorr | June 6, 1939 |
| 2,169,442 | Wuensch | Aug. 15, 1939 |
| 2,185,785 | Dorr et al. | Jan. 2, 1940 |
| 2,254,176 | Fischer | Aug. 26, 1941 |
| 2,264,912 | Kupper | Dec. 2, 1941 |
| 2,355,640 | Fischer et al. | Aug. 15, 1944 |
| 2,509,933 | Lind | May 30, 1950 |
| 2,566,988 | Kolb | Sept. 4, 1951 |
| 2,635,758 | Walker | Apr. 21, 1953 |